(12) United States Patent
Costarella

(10) Patent No.: US 8,651,439 B2
(45) Date of Patent: Feb. 18, 2014

(54) SUPPORT STRUCTURE

(76) Inventor: Zachary Costarella, Dracut, MA (US)

( * ) Notice: Subject to any disclaimer, the term of this patent is extended or adjusted under 35 U.S.C. 154(b) by 116 days.

(21) Appl. No.: 13/114,416

(22) Filed: May 24, 2011

(65) Prior Publication Data

US 2012/0298812 A1    Nov. 29, 2012

(51) Int. Cl.
*F16M 11/38* (2006.01)
(52) U.S. Cl.
USPC .............................. 248/166; 248/165; 135/901
(58) Field of Classification Search
USPC ........... 248/156, 163.1, 165, 166, 188.6, 530, 248/533, 168, 169, 170, 171; 43/1, 2, 61; 135/157, 901
See application file for complete search history.

(56) References Cited

U.S. PATENT DOCUMENTS

| | | | |
|---|---|---|---|
| 1,635,756 A * | 7/1927 | Leach | 135/98 |
| 2,799,543 A * | 7/1957 | Tomaselli | 108/50.12 |
| 3,194,403 A * | 7/1965 | Van Horn, Jr. | 211/78 |
| 4,061,302 A | 12/1977 | Boone | |
| 4,478,234 A * | 10/1984 | Bester | 135/98 |
| 5,117,593 A * | 6/1992 | Tiernan | 52/20 |
| 5,161,561 A * | 11/1992 | Jamieson | 135/16 |
| 5,179,907 A | 1/1993 | Galbraith | |
| 5,222,705 A | 6/1993 | Gibran et al. | |
| 5,293,889 A * | 3/1994 | Hall et al. | 135/16 |
| 5,406,968 A * | 4/1995 | Friedman et al. | 135/16 |
| 5,934,628 A | 8/1999 | Bosnakovic | |
| 6,659,409 B2 | 12/2003 | Ashjaee | |
| 7,086,631 B2 | 8/2006 | Lee et al. | |
| 7,604,208 B2 | 10/2009 | Tacklind | |
| 7,703,725 B2 | 4/2010 | May | |
| 2009/0250567 A1 | 10/2009 | Raynaud | |

* cited by examiner

*Primary Examiner* — Gwendolyn W Baxter
(74) *Attorney, Agent, or Firm* — Lambert & Associates; Gary E. Lambert; David J. Connaughton, Jr.

(57) ABSTRACT

A support structure having a body, an arm or plurality of arms connected to the body, a quick release device constructed and arranged to move the support structure from a support mode capable of supporting a cover, to a collapsed mode not capable of supporting a structure. A kit for creating a shelter having a support structure, a cover, and a kit housing.

16 Claims, 8 Drawing Sheets

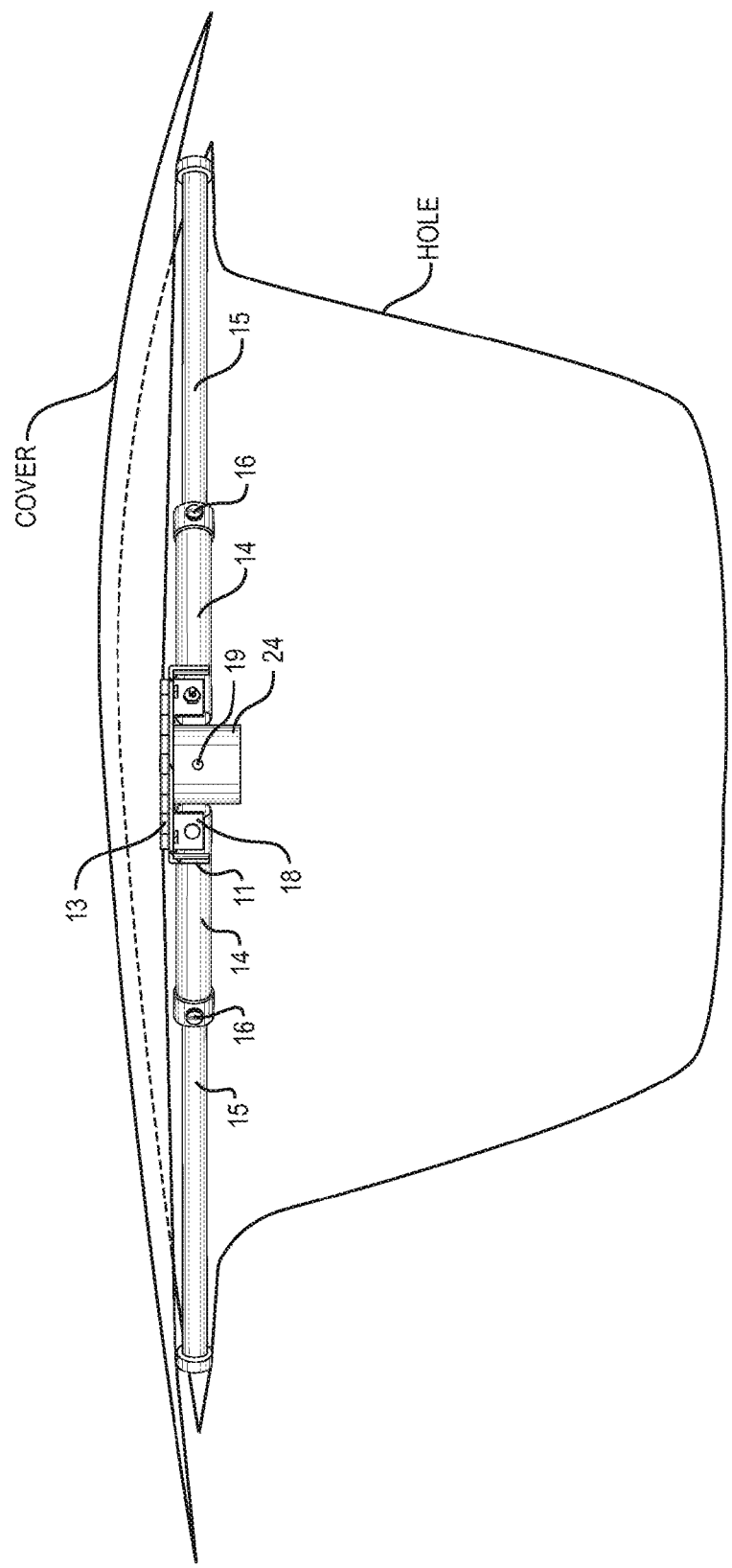

SUPPORT STRUCTURE

BACKGROUND OF THE INVENTION

1. Field of the Invention

The present invention relates generally to support structures. More particularly, the present invention relates to a support structure that may support a tarp or other cover.

2. Description of Related Art

Shelters are often vital for those in the wilderness, to both protect individuals from the elements, and to provide camouflage and cover. Often this shelter is in the form of a hole or trench with a tarp or other similar cover draped over the hole. In some instances a stick may be used to prop up the center of the tarp to keep the tarp from falling into the hole. This crude sheltering structure is limited to small hole diameters, and creates only a fragile, unreliable and unstable shelter.

In some cases, wire is employed to add rigidity to the tarps. However, this makes transportation of the tarp more cumbersome because of added weight and size.

Therefore, what is needed is a device capable of more reliably supporting a tarp or similar cover across a hole that is easily transportable.

SUMMARY OF THE INVENTION

The subject matter of this application may involve, in some cases, interrelated products, alternative solutions to a particular problem, and/or a plurality of different uses of a single system or article.

In one aspect, a support structure is provided. This support structure comprises a central body that defines a connection point at an outside portion and defines a coupling at its center. The support structure has an arm connected to the connection point of the body, and the arm is capable of movement about the connection point. The body further has a quick release device on the central body, constructed to move the support structure from a support mode capable of supporting a cover, to a collapsed mode not capable of supporting a structure.

In another aspect, a support structure is provided. The support structure comprises a central body that defines a connection point and a coupling. An arm is connected to the connection point of the central body, and is capable of movement about the connection point from a downwardly extending position to a radially extending position. A support leg is removably mounted to the coupling of the central body. A quick release device is disposed between the arm and the central body. When the quick release device is in an activated mode, it may automatically move the arm from a support mode to a collapsed mode. A cover is provided to be positioned over the central body and arm when the arm is in a radially extending position.

In yet another aspect, a kit for creating a shelter is provided. The kit comprises a support structure comprising a central body defining a connection point, an arm connected to the connection point and a quick release device. The kit further comprises a cover, and a kit housing.

BRIEF DESCRIPTION OF THE DRAWINGS

FIG. 8 provides an view of one embodiment of the support structure in operation.

DETAILED DESCRIPTION

Figure 1:
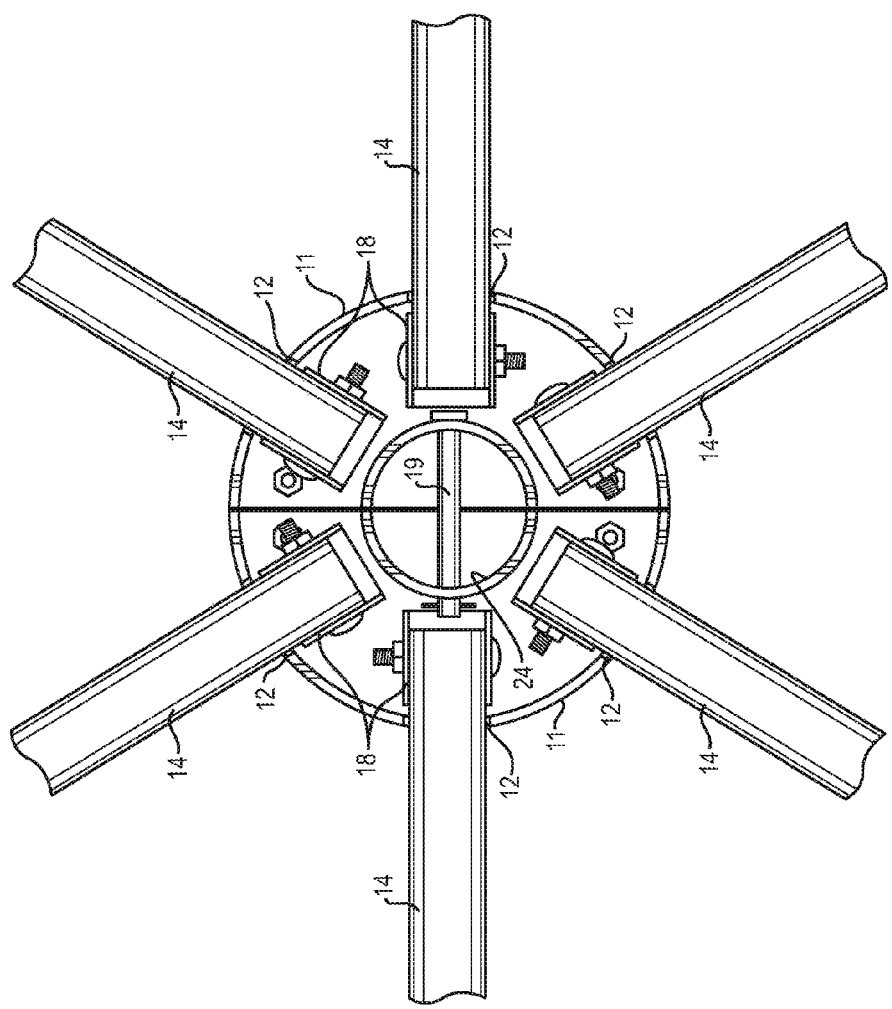
FIG. 1 provides a bottom side detail view of an embodiment of the components connected to the central body is shown.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In one aspect, the present invention provides a support structure for a tarp or similar covering to aid in the formation of a shelter. The support may have a central body that provides a central connection point for the support structure elements. The central body may define a plurality of radial connection points, intended to receive a plurality of arms. The central body may further define a coupling, constructed and arranged to receive a support leg at the center of the central body. Additionally, the support structure may have a quick release device which may allow the support structure to move from a support mode to a collapsed mode.

The support structure may be of any size and shape that is capable of providing support of a tarp or similar cover. The central body may be cylindrical or puck shaped. In one embodiment, the central body may be 4.5 inches in diameter, and 1 inch in height. The arms and support leg may be of any length to provide support for a tarp or similar cover, and may vary depending on the size of the span intended to be covered. In one embodiment, the arms may be 30 inches in length, and may telescopically expand in length to 54 inches. In one embodiment, the support leg may be 24 inches in length and telescope to 48 inches. The sizing of all elements of the device may vary without straying from the scope of the present invention.

The support structure may be constructed of any material capable of supporting a tarp or similar cover. Preferably the device may be constructed of lightweight, durable material to allow it to be easily transported, and reused. Materials of which the support structure may be made include but are not limited to metals, plastics, and wood. The body may be manufactured using methods known to those skilled in the art, such as injection molding, blow molding, or extrusion.

In one embodiment, the central body may be constructed with a flange extending from its outer perimeter. This flange may be used to secure a plurality of arms, or the flange may define one or a plurality of slots for the arms to extend through.

One or a plurality of arms may be connected to the central body in a manner that allows the arms to extend radially from the central body. In one embodiment, the connection may allow movement of the arms about a connection point. The arms may rotate from a downwardly extending position, where the arms are perpendicular to a top surface of the central body, to a radially extending position, where the arms are positioned at least substantially parallel with the top surface of the central body and extending substantially radially therefrom.

One embodiment of the connection may be a U shaped bracket which allows approximately 90 degrees of rotation of an arm from a downwardly extending position to a radially extending position. The U shaped bracket may be connected to the central body in any suitable manner. For example the bracket may be molded into the structure of the central body, or may be attached to the central body by a rivet, adhesive, screw or nail.

In a further embodiment, the arm connection structure may have a locking feature that allows the arms to be securely maintained in a radially extending position. In one embodiment, the locking feature may be in the form of a detent or clip on the central body that a portion of the arm may be snapped into. In another embodiment, a locking bar may move from an open to closed position to lock the arm into position. In still another embodiment, friction between the arm and the connection on the central body may act as a locking feature.

In another embodiment the arms may be molded to the central housing, connected by a flexible portion of the arms. The molded attachment may allow the arms to move from a downward to radial position by the flexing of the flexible portion, and also prevent motion of the arms beyond a radially extended position.

The arms may be of any size and shape to be moved from a downwardly extending position to a radially extending position, including tubes with a circular, rectangular or other shaped cross section.

In one embodiment, the arms may be telescoping, by having a first portion with an inner diameter slightly larger than an outer diameter of a second portion. In a further embodiment, the arms may be multiply telescoping, in that the arm comprises multiple portions, each portion having a slightly larger inner diameter than the outer diameter of the portion designed to fit within it. The telescoping design is advantageous because it increases portability by decreasing size, and at the same time allows the support structure to support a larger tarp or cover, and cross a larger span.

The telescoping portions may include a locking structure to position and control the different telescoping arm portions. It should be understood that the telescoping action and positioning may be controlled by any structure capable of locking the arm portions in a first mode, and allowing movement of the arm portions in a second mode.

In one embodiment, the telescoping action and positioning of the arms may be controlled by a locking screw for each telescoping portion. The locking screw may be attached to the outer portion and constructed so that a screw may apply force against the inner portion, locking it in position by the frictional force between the screw and the inner portion.

In another embodiment, the telescoping action and positioning may be controlled by a twist lock feature, allowing movement of the inner portion when twisted in one direction, and preventing movement when twisted to a locked position.

In still another embodiment, the telescoping action and positioning may be controlled by a plurality of apertures defined along the length of the first arm portion. The second arm portion may have a spring loaded button extending from its outer diameter which may engage the apertures by protruding through one of the apertures of the first arm portion. The button may be depressed, disengaging it from the aperture, allowing movement of the second arm portion.

Distal ends of the support arms may further have padded feet. The padded feet may enhance the ability of the distal ends of the arms to remain secure when crossing a span.

In another embodiment, the distal ends of an arm may come to a tip. The tip may enhance the ability of the distal ends of the arms to remain secure when crossing a span.

The central body may define a coupling at its center. The coupling is constructed and arranged to receive and secure a support leg. The coupling may be constructed in any fashion capable of receiving and securing the support leg.

In one embodiment, the coupling may be constructed as a tube, with an inner diameter slightly larger than an outer diameter of the support leg. The support leg may therefore be inserted into the coupling and held by the frictional forces between the inner diameter of the coupling and the outer diameter of the support leg.

In another embodiment, the coupling may be constructed as a tube that has a quick-release device running across its diameter. In this embodiment, the support leg has an L shaped grove at its top. The L shaped groove is constructed to receive a pin that crosses a diameter of the coupling. Upon insertion and twisting of the leg, the leg may be locked into the coupling.

In another embodiment, the support leg may have a ridge extending about its outer circumference. This ridge corresponds to a groove depressed about an inner circumference of the coupling. The support leg and coupling may be joined by forcing the support leg into the coupling until the ridge and groove interlock.

In yet another embodiment, the coupling may have clamps that are constructed to latch onto the support leg, thereby securing the support leg to the coupling.

The support leg may be of any size and shape that allows connection to the central body. Further, the support leg may have the ability prevent sagging of the support structure and the tarp or other cover being supported, when the support structure is extended across a span. For example, the support leg may be tubular, with a circular, rectangular or other shaped cross section.

In one embodiment the support leg may be telescoping. The telescoping support leg may have two or more sections, a first section being connected to the central body, and having an inner diameter that is slightly larger than the outer diameter of a second portion. Multiple telescoping portions are possible, with each portion having an outer diameter slightly smaller than the inner diameter of the previous portion.

The telescoping portions of the support leg may include a locking structure to position and control the different telescoping support leg portions. It should be understood that the telescoping action and positioning may be controlled by any structure capable of locking the support leg portions in a first mode, and allowing movement of the support leg portions in a second mode.

In one embodiment, the telescoping action and positioning of the support leg may be controlled by a locking screw for each telescoping portion. The locking screw may be attached to the first portion and constructed so that a screw may apply force against the second portion, locking it in position by the frictional force between the screw and the second portion.

In another embodiment, the telescoping action and positioning may be controlled by a twist lock feature, allowing movement of the second portion when twisted in one direction, and preventing movement when twisted to a locked position.

In still another embodiment, the telescoping action and positioning may be controlled by a plurality of apertures defined along the length of the first support leg portion. The second support leg portion may have a spring loaded button extending from its outer diameter which may engage the apertures by protruding through one of the apertures of the first support leg portion. The button may be depressed, disengaging it from the aperture, allowing movement of the second support leg portion.

A footing may be connected to a bottom of the support leg. The footing may cover the bottom of the leg to provide added traction, durability and stability of the support structure.

The support structure may include a quick release device. The quick release device allows the support structure to quickly and automatically move from a support mode to a collapsed mode. In a support mode, the support structure is capable of supporting a cover draped over it. In a collapsed mode, the support structure may not support a cover draped over it. Further, the collapsed mode is the preferred mode of transportation for the support structure because the structure is in a more compact and convenient shape for carrying.

In one embodiment of the quick release device, the central body may be made in a two piece construction, with each piece being hingedly connected to the other. The two piece construction is constructed and arranged to allow the central body to lie flat in a first position, and to fold over itself in a second position. Therefore, when the central body is in a first position, the support structure may be in a support mode and the structure can be laid across a span. When the central body is in a second position, the body will be unable to support the arms in an extended position across a span, and the support structure will be in a collapsed mode.

In this embodiment, the coupling of the central body is also split in two pieces, one piece connected to each one of the central body pieces. A quick release device may hold the coupling together across its split, which holds the hinged central body in a first position. The pin, when removed may allow the coupling to separate and in turn allows the central body to quickly move from a first position to second position, which in turn allows the support structure to move from a support mode to a collapsed mode.

In another embodiment, the quick release device may be a spring or other force-applying structure that may be connected to the central body at a first end, and to an arm at a second end. The arm may be moved and locked in a radially extending position against the force of the spring. Upon activation of the quick release device, the arm may be unlocked, and the arms may move to a collapsed mode by the force applied by the spring. In another embodiment, gravity may act to move the support structure to a collapsed mode. For example, gravity may act when, after releasing a locking mechanism, the arms are allowed to fall to a downwardly extending position by constructing the connection between the arm and the central body to allow free movement of the arm when not in a locked position.

In yet another embodiment, the quick release device may employ multiple structures to move the support structure from a support mode to a collapsed mode. For example, a quick release pin may maintain a two part body in a first position, as discussed above, and the pin may also be tied to a spring-release to allow a spring to act on the arms to bring them from a radially extending position to a downwardly extending position.

In one embodiment, the support structure may be equipped with a carrying structure. The carrying structure may be any structure that facilitates carrying and transportation. For example, the support structure may have clips at opposing ends of its length, to which a strap may be attached. In another example, a handle may be attached along the length of one of the arms, the support leg, or the central body.

A cover may be permanently connected to the arms of the support structure. In this embodiment, the support structure and the cover are integral, thereby increasing portability and ease of set up of the support structure.

In one embodiment of operation, the arms of the support structure may be extended and the support structure may be laid across a span such as a trench or hole. A tarp may then be placed over the support structure, providing a covering for the span. Optionally, when the support structure is placed over a large span, a support leg may be employed to provide additional support to the support structure. The support leg may be secured to the coupling of the central body at a proximal end, and extended so that it reaches the bottom of the span at a distal end. When the structure thus created needs to be collapsed, a user may activate the quick-release device, allowing the weight of the tarp and gravity to cause the hinged central body to move to a second position by folding over itself, and causing the support structure to move to a collapsed position, and quickly collapse into the hole.

In another embodiment of operation, the arms of the support structure may be extended and brought to a locked position, and the support leg may be coupled to the central body. The support structure so oriented may then have a tarp draped over it, thereby forming a tent-type structure.

One embodiment of the present invention involves a kit for constructing a shelter. The kit may include an embodiment of the support structure above, a cover, a kit housing and an optional instruction manual.

The cover may be any thin, portable, flexible sheet. Examples of covers include tarps, canvas sheets, cotton sheets, woven plastic fabrics, and the like.

The kit housing may be any housing capable of enclosing both the support structure and the cover. Examples of the kit housing may include a bag, straps capable of enclosing the cover when rolled about the support structure, a box, or the like.

Turning now to FIG. 1, a bottom side detail view of an embodiment of the components connected to the central body is shown. The central body 11 defines a plurality of slots 12 through which the arms 14 of the support structure may pass to connect to the central body 11. Each arm 14 is shown to connect to an arm hinge 18. This embodiment shows the arm hinge 18 as a U-shaped bracket. The arm hinge 18 allows the arms to be rotated about the hinge from a radially extended position to a downwardly extended position. A pin 19 is shown passing through a coupling 24 at the center of the central body 11.

Figure 2:
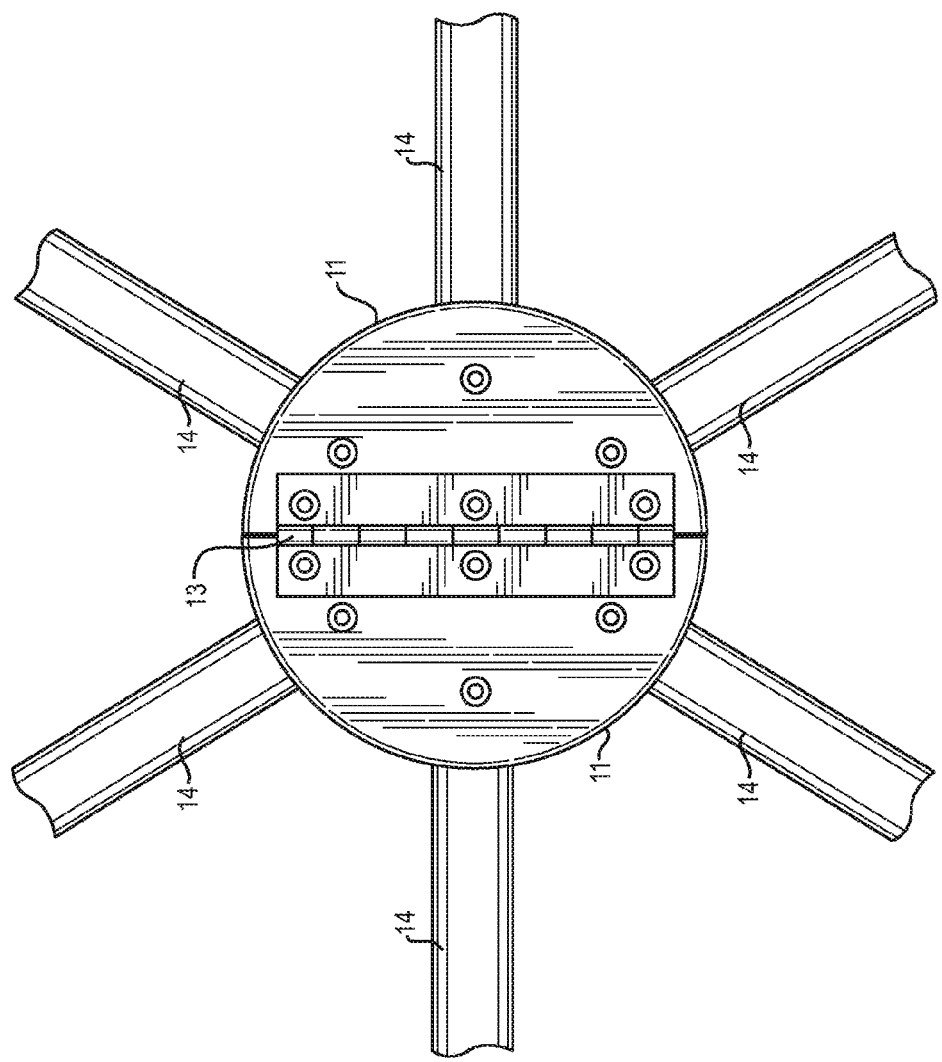
FIG. 2 provides a top side detail view of an embodiment of the central body and its components.

FIG. 2 shows a top side detail view of an embodiment of the central body and its components. The arms 14 are shown extending radially from the central body 11. Attached to a top of the central body 11 is a hinge 13. The central body 11 has two parts, connected together by the hinge 13. The hinge allows the central body 11 to move from the flat, first position shown in FIGS. 1 and 2, to a second position where the central body 11 is folded over itself. The pin 19 of FIG. 1 allows the central body 11 to lock into a flat first position. Were the pin 19 removed, the central body 11 would be free to rotate about the hinge 13.

Figure 3:
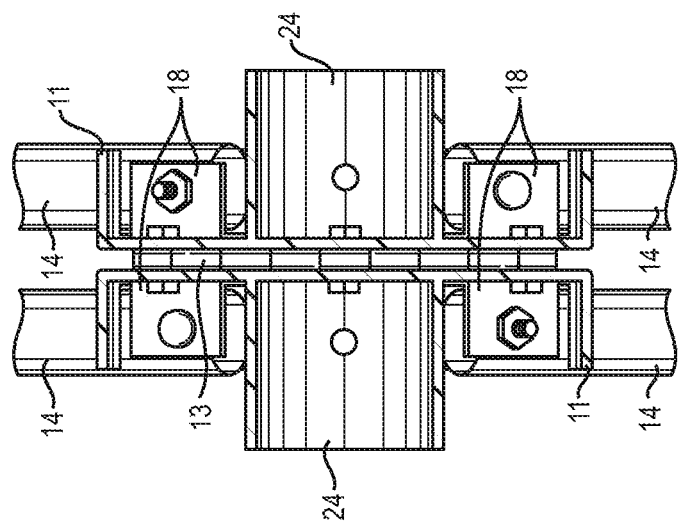
FIG. 3 provides a detail view of an embodiment of the central body folded over itself in a second position about the hinge.

FIG. 3 shows a detail view of an embodiment of the central body 11 folded over itself in a second position about the hinge 13. The arms 11 are shown extending radially. Arm hinges 18 secure the arms 14 to the central body 11. The coupling 24 of the central body 11 is shown in an opened position, showing two halves of the coupling 24.

Figure 4:
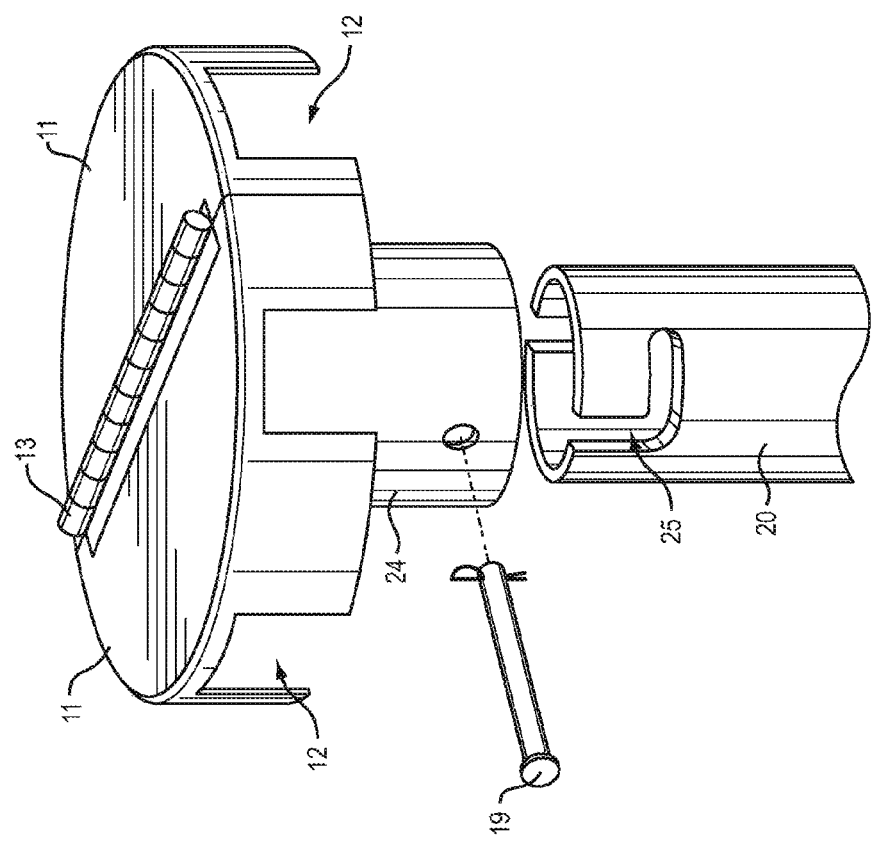
FIG. 4 provides a perspective view of an embodiment of the central body showing the connection between support leg and coupling.

FIG. 4 shows a perspective view of an embodiment of the central body showing the connection between support leg and coupling. The central body 11 is shown hinged 13 in a flat first position. The slots 12 for the arms are shown. The arms are excluded from this view to more clearly demonstrate the structure and connection of the support leg 20 to the central body 11 via the coupling 24. A pin 19 passes through the coupling 24. The support leg 20 may then be secured to the coupling 24 by the L-shaped groove 25 which allows the support leg 20 to insert into the coupling 24, around the pin 19. Upon twisting the support leg 20, the L-shaped groove 25 will secure the support leg 20 within the coupling 24 around the pin 19.

Figure 5:
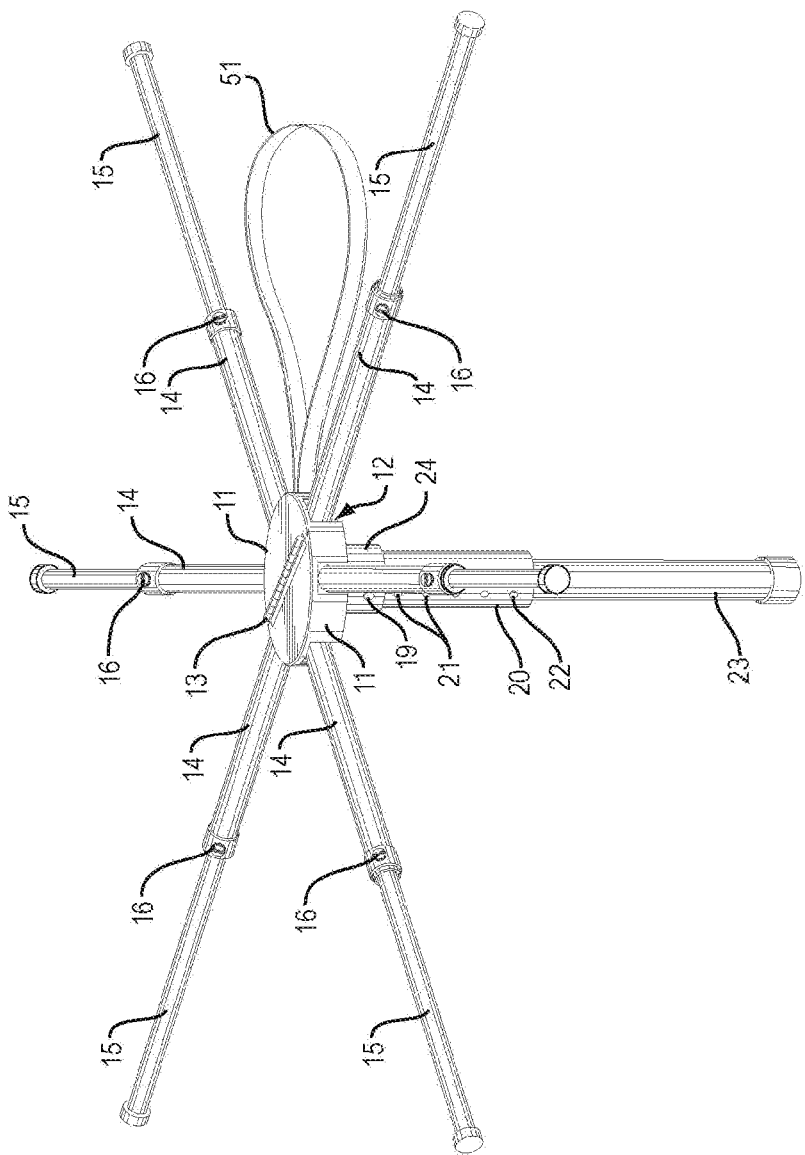
FIG. 5 provides a perspective view of an embodiment of the support structure.

FIG. 5 shows a perspective view of an embodiment of the support structure. A plurality of arms 14 are connected to the central body 11, and pass through slots 12 of the central body 11. The arms 14 are in a radially extending position. Further, the support leg 20 is connected to the central body 11 at the coupling 24. A hinge 13 holds the central body 11 in a flat first position. The pin 19 holds the body in this flat first position by passing through the coupling 24. A carrying structure 51 is shown attached to the central body 11.

The arms 14 of the support structure has second portions 15 which are telescopically extendable from the arm 14. A screw lock 16 provides friction to secure the arm second portions 15 in place, and when the friction is released, allows the second portion 15 to retract within the arm 14.

The support leg 20 has a second portion 23 which is telescopically extendable from the support leg 20. The second portion 23 may have a spring loaded button 22 which passes through one of a plurality of support leg apertures 21. The button 22, when depressed, allows the second portion 23 to move freely. The button 22 when passed through one of the plurality of support leg apertures 21, locks the second portion 23 in place.

Figure 6:
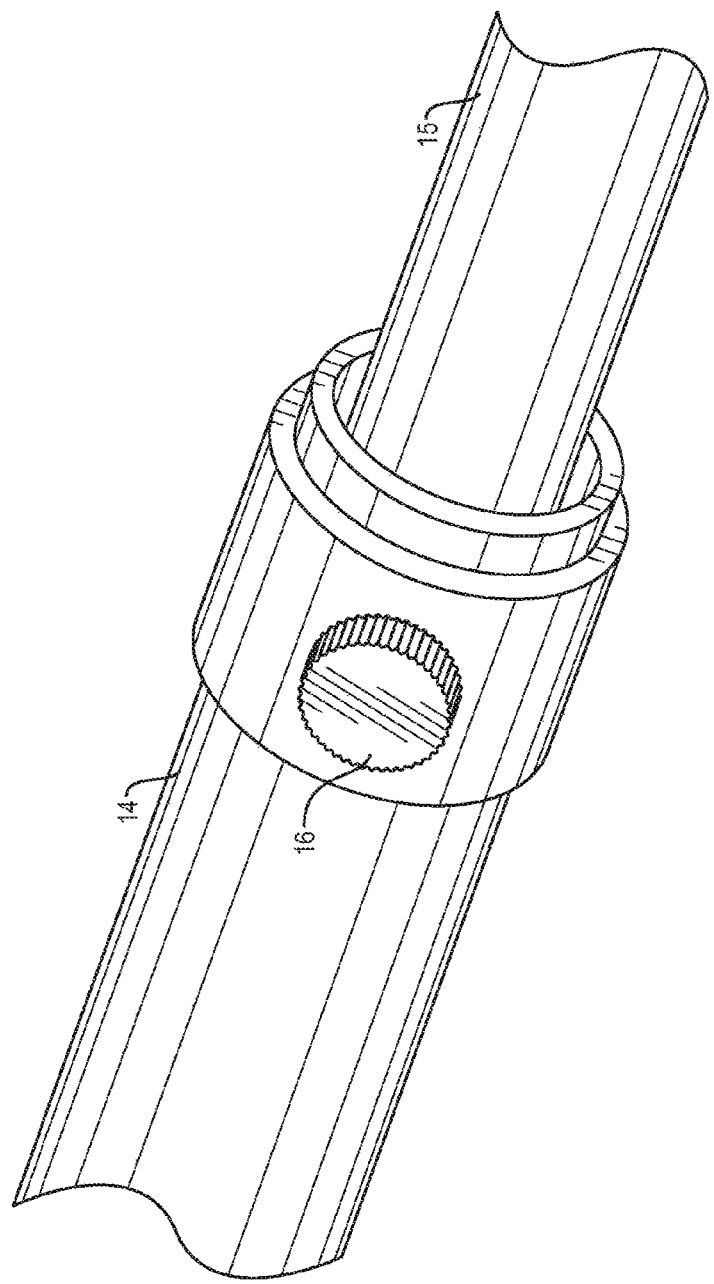
FIG. 6 provides a detail view of one embodiment of the screw lock that controls the positioning of the arm and the arm second portion in relation to each other.

FIG. 6 shows a detail view of one embodiment of the screw lock 16 that controls the positioning of the arm 14 and the arm second portion 15 in relation to each other. The screw lock 16 may be rotated to press a screw (not shown) against a surface of the arm second portion 15, thereby locking the arm second portion 15 in place. To move the arm second portion 15, the screw lock 16 may be rotated to pull a screw (not shown) away from the surface of the arm portion 15, allowing free motion of the arm second portion 15.

Figure 7:
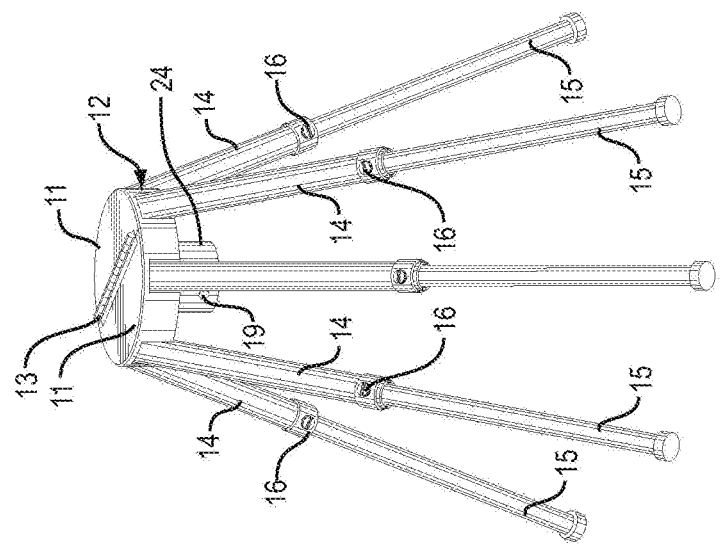
FIG. 7 provides a perspective view of the support structure with the arms in a downwardly extending position.

FIG. 7 shows a perspective view of the support structure with the arms in a downwardly extending position. A plurality of arms 14 are connected to the central body 11, and pass through slots 12 of the central body 11. The arms are in a downwardly extending position. A hinge 13 holds the central body 11 in a flat first position. The pin 19 holds the body in this flat first position by passing through the coupling 24.

The arms 14 of the support structure has second portions 15 which are telescopically extendable from the arm 14. A screw lock 16 provides friction to secure the arm second portions 15 in place, and when the friction is released, allows the second portion 15 to retract within the arm 14.

FIG. 8 shows a view of an embodiment of the support structure in operation. The arms 14 has arm second portions 15 telescopically extending across a span of a hole. The arm second portions 15 are held in place by screw locks 16. The arms 14 connect to the central body 11 by an arm hinge 18 for each arm 14. A cover is shown laid over the support structure, fully covering the hole. The central body 11 is held in a first flat position, and prevented from collapsing to a second position folded over itself by the pin 19 which passes through the coupling 24. Were the pin 19 to be removed, the central body 11 would fold over itself under its own weight and the weight of the cover, moving to a second position.

The support structure of the present invention may have particular applicability to military applications. In such applications, shelters often must be rapidly constructed and deconstructed. These shelters may be in the form of dug-in trenches or holes where preferably camouflaged covers are employed to provide both shelter and protection from detection. The present invention may be either placed across the trench or hole, or placed with the support leg on the ground and the arms extended, thereby providing support for the cover. Moreover, military applications typically require a support structure that can be rapidly deconstructed. The present invention aids in rapid deconstruction of the shelter by the quick release device. It should be understood, however, that the present invention is not limited to military applications, but is additionally valuable for camping, hunting, survival situations, wilderness excursions, and the like.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A support structure comprising:
   a body, defining a connection point at an outside portion of the body, and defining a coupling at a center of the body;
   an arm, having a proximal end connected to the body at the connection point, and a distal end of the arm constructed and arranged to rest at an edge of a span;
   wherein the arm being capable of movement about the connection point; and
   a quick release device on the body, constructed and arranged to move the support structure from a support mode capable of supporting a cover, to a collapsed mode not capable of supporting the cover;
   wherein the body further comprises:
      a first piece and a second piece, the first piece and the second piece connected together by a hinge; and
      wherein the coupling comprises a first piece and a second piece, the first piece of the coupling defined by the first piece of the body, the second piece of the coupling defined by the second piece of the body.

2. The support structure of claim 1 further comprising:
   a plurality of arms; and
   wherein the body defines a plurality of connection points at the outside portion of the body, each of the plurality of arms connected to one of the plurality of connection points.

3. The support structure of claim 1 further comprising a support leg removably mounted to the coupling of the body at a proximal end of the support leg.

4. The support structure of claim 3 wherein the support leg is telescoping.

5. The support structure of claim 1 wherein the arm is telescoping.

6. The support structure of claim 1 wherein the arm is multiply telescoping.

7. The support structure of claim 1 wherein the connection point of the body comprises an aperture defined by the body, and a U-shaped bracket.

8. The support structure of claim 1 wherein the arm is capable of approximately 90 degrees of motion, between a downwardly extending arm position and a radially extending arm position.

9. The support structure of claim 1 further comprising a locking device constructed and arranged to secure the arm in a radially extending position.

10. The support structure of claim 1 wherein the quick release device is a pin removably inserted through an aperture of the coupling first part and an aperture of the coupling second part, the pin constructed and arranged to prevent movement of the first piece and the second piece of the body about the hinge when inserted.

11. The support structure of claim 1 further comprising a carrying structure attached to the body.

12. A support structure comprising:
   a body defining a connection point at an outside portion of the body, and a coupling at a center of the body;
   an arm, having a proximal end connected to the connection point of the body, the arm being capable of movement about the connection point from a downwardly extending position to a radially extending position;
   a support leg removably mounted to the coupling at a proximal end;
   a quick-release device disposed between the arm and the body, when in an activated mode, the quick-release device constructed and arranged to automatically move the support structure from a support mode to a collapsed mode; and
   a cover positioned over the body and arm when in a radially extending position;
   wherein the connection point of the body comprises an aperture defined by the body, and a U-shaped bracket.

13. The support structure of claim 12 further comprising:
   a plurality of arms; and
   a plurality of connection points defined by the body, each of the plurality of arms connected to the body at one of the plurality of connection points.

14. The support structure of claim 13 further comprising a locking device constructed and arranged to secure the plurality of arms in the radially extending position.

15. The support structure of claim 14 further comprising a carrying structure attached to the body.

16. The support structure of claim 12 further comprising a carrying structure attached to the body.

* * * * *